United States Patent
Larsen et al.

(10) Patent No.: US 9,409,807 B2
(45) Date of Patent: Aug. 9, 2016

(54) USE OF PRIMARY SLUDGE FOR CARBON SOURCE IN AN AERATED-ANOXIC BIOREACTOR SYSTEM

(71) Applicant: Evoqua Water Technologies LLC, Alpharetta, GA (US)

(72) Inventors: Thomas J. Larsen, Waukesha, WI (US); Michael L. Doyle, Wauwatosa, WI (US)

(73) Assignee: Evoqua Water Technologies LLC, Warrendale, PA (US)

( * ) Notice: Subject to any disclaimer, the term of this patent is extended or adjusted under 35 U.S.C. 154(b) by 101 days.

(21) Appl. No.: 14/346,180

(22) PCT Filed: Sep. 25, 2012

(86) PCT No.: PCT/US2012/057086
§ 371 (c)(1),
(2) Date: Mar. 20, 2014

(87) PCT Pub. No.: WO2013/049046
PCT Pub. Date: Apr. 4, 2013

(65) Prior Publication Data
US 2014/0217015 A1    Aug. 7, 2014

Related U.S. Application Data

(60) Provisional application No. 61/539,007, filed on Sep. 26, 2011.

(51) Int. Cl.
*C02F 3/30* (2006.01)
*C02F 3/00* (2006.01)
(Continued)

(52) U.S. Cl.
CPC ............... *C02F 3/307* (2013.01); *C02F 3/006* (2013.01); *C02F 3/308* (2013.01); *C02F 1/38* (2013.01);
(Continued)

(58) Field of Classification Search
CPC .............. C02F 3/307; C02F 1/38; C02F 1/42; C02F 1/441; C02F 1/444; C02F 1/4693; C02F 3/006; C02F 3/308; C02F 2209/001; C02F 2209/005; C02F 2209/08; C02F 2209/16; C02F 2209/40; C02F 2303/04; C02F 2303/24; C02F 2101/105; C02F 2101/16; C02F 2203/00; C02F 2209/36; Y02W 10/15
USPC ......... 210/605, 610, 614, 620, 621, 622, 623, 210/252, 259
See application file for complete search history.

(56) References Cited

U.S. PATENT DOCUMENTS 4,999,111 A * 3/1991 Williamson .............. C02F 3/04
  210/605
6,129,104 A   10/2000 Ellard et al.
(Continued)

FOREIGN PATENT DOCUMENTS

WO    2009120384 A2    10/2009

OTHER PUBLICATIONS

Whittier et al., Siemens Water Academy Webinar, Aerated Anoxic Biological Processes, Jun. 22, 2011 [presentation online], [retrieved Nov. 27, 2012 from the internet] http://www.water.siemens.com/en/wastewater/pages/aerated-anoxic-webinar.aspx.*

(Continued)

*Primary Examiner* — Fred Prince

(57) ABSTRACT

A method and system of treating wastewater using primary sludge is disclosed. The treatment system includes a primary separator that separates a carbon source comprising non-solubilized suspended carbon from a source of wastewater. The non-solubilized suspended carbon is solubilized and used as a source of carbon in an aerated anoxic treatment system.

20 Claims, 2 Drawing Sheets

(51) Int. Cl.
    *C02F 1/38*           (2006.01)
    *C02F 1/42*           (2006.01)
    *C02F 1/44*           (2006.01)
    *C02F 1/469*         (2006.01)
    *C02F 101/10*       (2006.01)
    *C02F 101/16*       (2006.01)

(52) U.S. Cl.
    CPC . *C02F 1/42* (2013.01); *C02F 1/441* (2013.01); *C02F 1/444* (2013.01); *C02F 1/4693* (2013.01); *C02F 2101/105* (2013.01); *C02F 2101/16* (2013.01); *C02F 2203/00* (2013.01); *C02F 2209/001* (2013.01); *C02F 2209/005* (2013.01); *C02F 2209/08* (2013.01); *C02F 2209/16* (2013.01); *C02F 2209/36* (2013.01); *C02F 2209/40* (2013.01); *C02F 2303/04* (2013.01); *C02F 2303/24* (2013.01); *Y02W 10/15* (2015.05)

(56) References Cited

U.S. PATENT DOCUMENTS

| | | | |
|---|---|---|---|
| 6,139,743 A | 10/2000 | Park et al. | |
| 6,387,254 B1 * | 5/2002 | Takechi | C02F 3/1215 210/195.1 |
| 7,413,654 B2 * | 8/2008 | Applegate | C02F 3/006 210/605 |
| 7,713,413 B2 * | 5/2010 | Barnes | C02F 3/1273 210/605 |
| 2009/0090670 A1 | 4/2009 | Elefritz et al. | |
| 2011/0203992 A1 * | 8/2011 | Liu | C02F 1/286 210/607 |

OTHER PUBLICATIONS

Carrere, H., "Pretreatment Methods to Improve Sludge Anaerobic Degradability: A Review," Journal of Hazardous Materials 183 (2010) pp. 1-15.

* cited by examiner

US 9,409,807 B2

USE OF PRIMARY SLUDGE FOR CARBON SOURCE IN AN AERATED-ANOXIC BIOREACTOR SYSTEM

CROSS-REFERENCE TO RELATED APPLICATIONS

This application is a U.S. national phase application under 35 U.S.C. §371 of International (PCT) Patent Application Serial No. PCT/US2012/057086 filed Sep. 25, 2012, which in turn claims the benefit of priority to United States Provisional Patent Application Serial No. 61/539,007 filed Sep. 26, 2011.

FIELD OF TECHNOLOGY

Aspects and embodiments of the present invention are directed generally to systems and methods for the treatment of wastewater. In some embodiments, the wastewater treatment includes the removal of at least one of nitrogen and phosphorous species from the wastewater.

SUMMARY

One or more aspects of the present disclosure involve methods of treating wastewater. The method can comprise introducing wastewater into a primary separator; separating a first carbon source comprising non-solubilized suspended carbon from the wastewater in the primary separator to form an effluent; removing the first carbon source from the primary separator; introducing the effluent into an aerated anoxic treatment unit; measuring a value of a process parameter in the aerated anoxic treatment unit; comparing the value of the process parameter to a target value to obtain a result; introducing a quantity of the first carbon source into the aerated anoxic treatment unit, the quantity introduced responsive to the result; solubilizing at least a portion of the non-solubilized suspended carbon in the first carbon source in the aerated anoxic treatment unit; and providing conditions for the effluent to be treated in the aerated anoxic treatment unit to form an anoxically treated liquid.

In a further aspect, the first carbon source comprises primary sludge. In another aspect, the quantity of the first carbon source introduced into the aerated anoxic treatment unit ranges from about 15% to about 75% of a total quantity of the first carbon source removed from the primary separator. In certain aspects, the method further comprises introducing a second carbon source including one of methanol, ethanol, and acetic acid into the aerated anoxic treatment unit, the quantity of the second carbon source introduced into the aerated anoxic treatment unit responsive to the result.

In some aspects, measuring the value of the process parameter comprises measuring a level of biological oxygen demand in the aerated anoxic treatment unit. In at least one aspect, the method further comprises determining a ratio of biological oxygen demand to total Kjeldahl nitrogen in the effluent; and adjusting the quantity the first carbon source introduced into the aerated anoxic treatment unit based on the ratio.

In yet another aspect, the method further comprises introducing the anoxically treated liquid into an aerobic treatment unit; and providing conditions for the anoxically treated liquid to be treated in the aerobic treatment unit to form an aerobically treated liquid. In another aspect, the method further comprises separating an aerobically treated sludge from the aerobically treated liquid; and introducing a portion of the aerobically treated sludge into the aerated anoxic treatment unit. In certain aspects, the method further comprises removing solids from the aerobically treated liquid in a secondary separator; and introducing the removed solids into the aerated anoxic treatment unit.

One or more further aspects of the present disclosure are directed to a wastewater treatment system. The wastewater treatment system can comprise a primary separator in fluid communication with a source of wastewater, the primary separator configured to output a first source of carbon comprising non-solubilized suspended carbon from a first outlet and to output an effluent from a second outlet; a biological treatment unit including a first inlet in fluid communication with the first outlet of the primary separator and a second inlet in fluid communication with the second outlet of the primary separator; and a control system configured to select a quantity of the first carbon source to be introduced into the biological treatment unit responsive to a result of a comparison between a value of a process parameter of the wastewater treatment system and a target value for the process parameter.

In a further aspect, the biological treatment unit is an aerated anoxic treatment unit. In another aspect, the system further comprises a second source of carbon comprising solubilized carbon in fluid communication with the aerated anoxic treatment unit. In certain aspects, the second source of carbon includes at least one of methanol, ethanol, and acetic acid.

In at least one aspect, the system further comprises an aerobic treatment unit having an inlet in fluid communication with an outlet of the aerated anoxic treatment unit. In some aspects, a third inlet of the aerated anoxic treatment unit is in fluid communication with an outlet of the aerobic treatment unit. In another aspect, the system further comprises a secondary separator having an inlet in fluid communication with an outlet of the aerobic treatment unit and an outlet configured to output activated sludge. In certain aspects, a third inlet of the aerated anoxic treatment unit is in fluid communication with the outlet of the secondary separator.

In a further aspect, the system further comprises a measurement system configured to measure at least one of a level of biological oxygen demand in the biological treatment unit and a ratio of biological oxygen demand to total Kjeldahl nitrogen in the effluent.

One or more aspects of the present disclosure are directed to a method of modifying a water treatment system including a primary separator and an aerated anoxic treatment unit positioned downstream of the primary separator. The method can comprise providing for introduction of a first carbon source comprising primary sludge from the primary separator into the aerated anoxic treatment unit; and providing for a control system to select a non-zero quantity of the first carbon source and a quantity of a second carbon source including at least one of methanol, ethanol, and acetic acid to be introduced into the aerated anoxic treatment unit responsive to a result of a comparison between a value of a process parameter of the water treatment system and a target value for the process parameter. In a further aspect, the method includes reducing a concentration of nitrate in anoxically treated liquid exiting the aerated anoxic treatment unit by about 50%.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
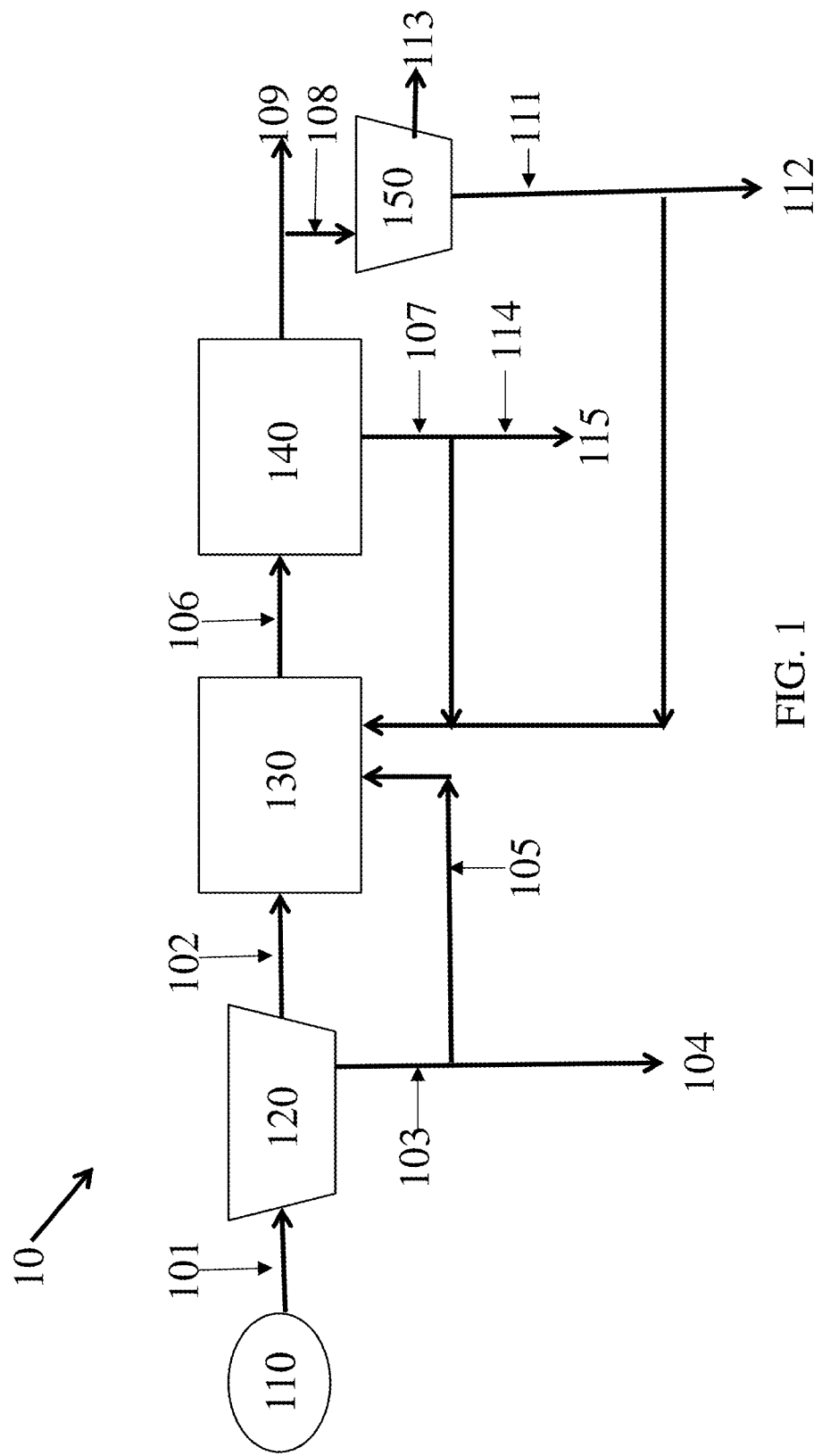
FIG. 1 is a flow diagram illustrating a representative treatment system pertinent to one or more aspects of the invention.

The presence of nitrogen and phosphorous in wastewater introduced into surface waters are primary causes of cultural eutrophication (i.e., nutrient enrichment due to human activity) in the surface waters. The most recognizable manifestations of this eutrophication are algal blooms that occur during the summer. Chronic symptoms of over-enrichment include low dissolved oxygen, fish kills, murky water, and depletion of desirable flora and fauna. In addition, the increase in algae and turbidity increases the need to chlorinate drinking water, which in turn, leads to higher levels of disinfection by-products that have been shown to increase the risk of cancer. Excessive amounts of nutrients can also stimulate the activity of microbes, such as Pfisteria which may be harmful to human health (Grubbs, Geoffrey, Director of Science and Technology, United States Environmental Protection Agency, *Memorandum: Development and Adoption of Nutrient Criteria into Water Quality Standards*, Nov. 14, 2001).

Approximately 25% of all water body impairments are due to nutrient-related causes, for example, nutrients, oxygen depletion, algal growth, ammonia, harmful algal blooms, biological integrity and turbidity (United States Environmental Protection Agency, *National Section* 303(*d*) *List Fact Sheet*, 2007). In efforts to reduce the number of nutrient impairments, many point source dischargers have received more stringent effluent limits for nitrogen and phosphorous. Biological nutrient removal systems are utilized to remove total nitrogen and total phosphorous from wastewater through the use of microorganisms under different environmental conditions in the treatment process (Metcalf & Eddy, Tchobanoglous, George, and Burton, Franklin L (2002). *Wastewater Engineering Treatment and Reuse* (4$^{th}$ ed.). McGraw-Hill).

One or more aspects of the methods and systems disclosed herein relate to a method of treating wastewater. As used herein, the terms "feed," "wastewater stream," and "wastewater" refer to water to be treated, such as streams of bodies of water from residential, commercial, or municipal, industrial, and agricultural sources, as well as mixtures thereof, that may contain at least one undesirable species, or pollutant, comprised of biodegradable, inorganic or organic, materials that can be decomposed or converted by biological processes into environmentally benign, or at least less objectionable, compounds. More specifically, the undesirable constituent may be a biodegradable material, such as an inorganic or organic compound that participates or is involved in the metabolism of a microorganism. For example, the undesirable constituent may include nitrate, nitrite, phosphorous, ammonia, and the like. The type and concentration of undesirable constituents present in the wastewater may be site-specific. The water to be treated can also contain biological solids, inert materials, organic compounds, including recalcitrant or a class of compounds that are difficult to biodegrade relative to other organic compounds, as well as constituents from ancillary treatment operations such as, but not limited to, nitrosamines and endocrine disruptors.

As used herein, the term "wastewater treatment system" is a system, typically a biological treatment system, having a population of microorganisms, including a diversity of types of bacteria, used to decompose biodegradable material. The conversion of pollutants to innocuous compounds is typically facilitated or mediated by the microorganisms as the wastewater is passed through the wastewater treatment system. A biomass of microorganisms typically requires an environment that provides the proper conditions for growth or biological activity.

In accordance with one or more embodiments, the invention relates to one or more systems and methods for treating wastewater. The wastewater treatment system may receive wastewater from a community, industrial or residential source. For example, the wastewater may be delivered from a municipal or other large-scale sewage system. Alternatively, the wastewater may be generated, for example, by food processing or pulp and paper plants. The wastewater may be moved through the system by operations upstream or downstream of the system.

According to one or more embodiments of the invention, the wastewater treatment system of the present invention may include one or more treatment units each having one or more treatment zones. As used herein, the term "treatment zone" is used to denote an individual treatment region, which can be characterized as promoting, effecting, or exhibiting a type of metabolic activity or biological process. Multiple treatment regions or zones may be housed in a single vessel. Alternatively, a treatment region or zone may be housed in a separate vessel, wherein a different treatment is carried out in each separate vessel. The treatment zones may be sized and shaped according to a desired application and to accommodate a volume of wastewater to be treated. For example, hydraulic residence times of various unit operations of the treatment system may depend on factors such as influent flow rate, effluent requirements, concentration of target compounds in the influent stream, temperature, and expected peak variations of any of these factors.

Each treatment zone may contain a fluidizable media to host microorganisms. Each treatment zone may be maintained at different conditions to enhance growth of different microorganisms. Without being bound by any particular theory, different microorganisms may promote different biological processes. For example, passing wastewater through denitrifying bacteria may increase the efficiency of a denitrifying process. Likewise, passing wastewater through nitrifying bacteria may increase the efficiency of a nitrifying process. The treatment unit may also comprise means for maintaining the fluidizable media within each treatment zone during operation. For example, a screen, perforated plate, baffle or fluid countercurrents may be used to maintain the fluidizable media within each treatment zone. The fluidizable media may, but need not be, similar in each treatment zone.

Prior to normal operation, the system may undergo a period of startup. Startup may involve biomass acclimation to establish a population of bacteria. Startup may run from several minutes to several weeks, for example, until a steady-state condition of biological activity has been achieved in one or more treatment unit operations.

Wastewater treatment processes in accordance with embodiments of the present invention may include multiple treatment areas or zones which can be roughly broken down into: (1) a preliminary treatment area; (2) a primary treatment area; and (3) a secondary treatment area.

The wastewater treatment process begins in the preliminary treatment area. Preliminary treatment is concerned with removing grit, sand, gravel, and damaging debris, such as cans, rags, etc., from untreated wastewater. This may be a two-stage treatment process whereby debris such as rags and cans are removed by screens and the grit and heavier inorganic solids settle out of the untreated wastewater as they pass through a velocity controlled zone. The damaging inorganic debris are thus removed by screening or settling, while any organic matter carried within the wastewater stream is transported forward to undergo further processing.

Following the preliminary treatment area, the wastewater is directed to a primary treatment area. The primary treatment area entails a physical process wherein a portion of the organic contaminants in the wastewater may be removed by flotation or sedimentation. The organic contaminants removed may include, for example, feces, food particles, grease, and paper. These organic contaminants are referred to herein as suspended solids. Primary treatment operations or systems can involve at least partial equalization, neutralization, and/or removal of largely insoluble material of the wastewater such as, but not limited to, fats, oils, and grease. In certain instances, 40-70% of the suspended solids are removed in this primary stage. The pretreatment and primary treatment operations may be combined. For example, primary clarifiers may be utilized to separate solids.

The third treatment stage is called secondary treatment and may comprise one or more biological treatment processes where bacteria are used under controlled conditions to remove nutrients or nonsettling suspended and soluble organics from the wastewater. These materials would result in an unacceptable biological oxygen demand (BOD) if left untreated. Secondary treatment may employ a biomass with bacteria or a consortium of microorganisms to at least partially hydrolyze or convert biodegradable material such as, but not limited to, sugar, fat, organic molecules, and compounds that create an oxygen demand in the water. For example, one mode of this process may comprise a vessel where wastewater is mixed with a suspension of microorganisms. This mixture is then aerated to provide oxygen for the support of the microorganisms that may then adsorb, assimilate, and metabolize the excess biological oxygen demand in the wastewater. After a sufficient retention time, the mixture is then introduced into a clarifier or settler into which the biomass separates as settled sludge from the liquid. The purified fluid may then overflow into a receiving stream.

Post-treatment or polishing operations or systems can include biological treatments, chemical treatments, and separation systems. The post-treatment operations may include processes that involve biological nitrification/denitrification and phosphorus removal. Chemical treatments that can be used may include chemical oxidation and chemical precipitation. Separation systems can include dissolved inorganic solids removal by ion exchange, ultrafiltration, reverse osmosis, or electrodialysis. Further treatment processes can involve disinfection, decontamination or inactivation of at least a portion of any residual microorganisms by chemical or physical means. For example, disinfection can be effected by exposure to any one or more of oxidizing agents or to actinic radiation. Commercially available separation systems that may be utilized in some embodiments of the invention include those employing the CMF-S™ continuous membrane filtration modules as well as the MEMCOR® CMF (Pressurized) XP, CP, and XS membrane filtration systems, from Siemens Water Technologies Corp. (Warrendale, Pa.). Other separators that can be used include filter presses and centrifuges.

One or more aspects of the present disclosure involve embodiments directed to the removal of or for the reduction of the level of one or more contaminants from wastewater. One or more aspects of the invention relate to wastewater treatment systems and methods of operation and methods of modification thereof.

The invention is not limited in its application to the details of construction and the arrangement of components, systems, or subsystems set forth herein, and is capable of being practiced or of being carried out in various ways. Typically, the water to be treated, such as wastewater or a wastewater stream, contains waste matter that, in some cases can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its nitrogen content to within acceptable limits.

One of the types of contaminants removed from wastewater in various aspects and embodiments of the present invention includes nitrogen species. The removal of nitrogen species from wastewater may involve the removal of total nitrogen compounds that comprise ammonia, nitrate, particulate organic nitrogen and soluble organic nitrogen. The removal process may involve nitrification and denitrification.

Nitrification is a microbial process by which ammonia is sequentially oxidized to nitrite and then to nitrate. The nitrification process is accomplished primarily by two groups of autotrophic nitrifying bacteria that can build organic molecules by using energy obtained from inorganic sources, for example, ammonia or nitrite.

In the first step of nitrification, ammonia-oxidizing bacteria oxidize ammonia to nitrite by the equation:

$$NH_3 + O_2 \rightarrow NO_2^- + 3H^+ + 2e^-$$

*Nitrosomas* is the most frequently identified genus associated with this step, although other genera including *Nitrosococcus* and *Nitrosospira* may be involved. The subgenera *Nitrosolobus* and *Nitrosovibrao* can also autotrophically oxidize ammonia.

In the second step of the process, nitrite-oxidizing bacteria oxidize nitrite to nitrate according to the equation:

$$NO_2^- + H_2O \rightarrow NO_3^- + 2H^+ + 2e^-$$

*Nitrobacter* is the genus most frequently associated with this second step, although other genera such as *Nitrospina*, *Nitrococcus* and *Nitrospira* can also autotrophically oxidize nitrite.

Denitrification is the process by which nitrates are reduced to gaseous nitrogen by facultative anaerobes. Facultative anaerobes, such as fungi, can flourish in anoxic conditions because they have the ability to break down oxygen-containing compounds such as nitrate to obtain oxygen. Once introduced into the aquatic environment, nitrogen can exist in many forms; dissolved nitrogen gas ($N_2$), ammonia ($NH_4^+$ and $NH_3$), nitrite ($NO_2^-$), nitrate ($NO_3^-$), and organic nitrogen as proteinaceous matter or in dissolved or particulate phases. The energy reactions associated with denitrification using methanol as a source of carbon are:

$$6NO_3^- + 2CH_3OH \rightarrow 6NO_2^- + CO_2 + 4H_2O \quad \text{Step 1}$$

$$6NO_2^- + 3CH_3OH \rightarrow 3N_2 + 3CO_2 + 3H_2O + 6OH^- \quad \text{Step 2}$$

$$6NO_3^- + 5CH_3OH \rightarrow 5CO_2 + 3N_2 + 7H_2O + 6OH^- \quad \text{Overall}$$

The organisms carrying out this process are called denitrifiers. In general, they are heterotrophic bacteria that metabolize readily biodegradable substrate under anoxic conditions using nitrate as the electron acceptor. If oxygen is available, these bacteria will metabolize the oxygen before the nitrate. Therefore, the concentration of dissolved oxygen should be maintained at a low level for the denitrification process to function efficiently. Oxygen is typically minimized by avoiding or limiting aeration of the wastewater and by maintaining a high concentration of BOD so that the microorganisms use all the oxygen.

A readily biodegradable organic compound (a carbon source) needs to be available to the denitrifying bacteria. Since denitrification may in some treatment systems occur downstream of aerobic treatment techniques where most organic material is oxidized, an additional source of carbon may need to be added to the process to sustain the growth of the denitrifying bacteria. The carbon source most often used is methanol although ethanol and acetic acid can also or alternatively be used. These chemicals, however, contribute to the cost of the wastewater treatment process.

An alternative source of carbon that may be used is primary sludge produced from a primary separator, for example, a primary clarifier of a wastewater treatment system. A primary clarifier may be in fluid communication with wastewater influent and may be used to remove particulate material prior to treatment of the clarified wastewater in an anoxic reactor. The removed particulate material may form primary sludge which is removed from the primary separator. The clarified wastewater may be referred to as effluent from the primary separator.

As used herein "primary sludge" refers to sludge which is separated from wastewater entering a primary separator (a first solids/liquid separation system), for example, a clarifier, of a wastewater treatment system, optionally after screening and/or grit removal. Primary sludge is the solids which are removed from a sludge outlet of the primary separator. Suspended solids leaving the primary separator suspended in effluent from the primary separator are not considered primary sludge. Primary sludge is created after the screen and grit filtering processes and the composition of the sludge depends on the characteristics of the wastewater that is fed into the separator. For example, primary sludge may comprise a high concentration of organic matter, such as feces, vegetables and fruits, textiles, paper, grit, and inorganic fines. The consistency may be a thick fluid with a water percentage between about 93% and about 97%. Primary sludge comprises carbon in suspended or particulate form. As used herein, the terms "suspended," "particulate," and "non-solubilized suspended" refer to material that is not dissolved in water. The carbon source may not be readily biodegradable because most or all of the organics are particulates and must be hydrolyzed (solubilized) before they are available for the bacteria used in the denitrification process. As used herein, the terms "hydrolyzed," "solubilized," and "soluble" refer to material that is dissolved in water. The chemical formula for one source of carbon found in municipal wastewater and primary sludge is $C_{10}H_{19}O_3N$.

In one or more embodiments, primary sludge may be directed to an aerated (or non-aerated) anoxic biological nutrient removal system to serve as a source of carbon for denitrifying bacteria. The primary sludge may be used rather than adding a supplemental carbon source, such as methanol. Depending on the amount of BOD contained in the primary sludge, additional carbon, for example in the form of methanol, ethanol, and/or acetic acid may desirably be added. The primary sludge addition can be controlled to optimize the amount of carbon being added to the aerated anoxic biological nutrient removal system without adding excessive quantities that could increase oxygen demand and sludge production (operating parameters) in the aerated anoxic reactor.

According to various embodiments, a supplemental source of carbon may be used during a start-up process, when the source of carbon in the primary sludge is still in the form of non-solubilized suspended carbon, and is therefore unavailable to microorganisms in the biological treatment unit. Once the process reaches steady-state conditions, the primary source of carbon may be switched over to consist of carbon from primary sludge. In certain embodiments, no supplemental source of carbon may need to be added to the biological treatment unit. In other embodiments, the quantity of carbon coming from supplemental sources may be minimized by using a control system. For example, the control system may be configured to only add carbon from supplemental sources when process conditions indicate that there is an insufficient quantity of carbon being provided by the primary sludge, or the solubilization of the carbon from the primary sludge is occurring at a rate that is unable to keep up with the carbon demand from the microorganisms.

The use of primary sludge as a carbon source in an aerated (or non-aerated) anoxic biological nutrient removal system may provide several advantages. Primary sludge can either reduce or eliminate the use of supplemental carbon sources such as methanol, ethanol, and/or acetic acid. The use of primary sludge as a carbon source as described herein may provide for downsizing or eliminating equipment associated with the storage and delivery of these supplemental carbon sources, which is often expensive due to the safety requirements such as explosion proofing of this equipment that must be met. These supplemental carbon sources are often considered hazardous materials, so reduction in the use of these supplemental carbon sources may result in increased safety of a wastewater treatment operation. The use of primary sludge as a carbon source as described herein may reduce the amount of primary sludge that has to be treated or disposed of. One or all of these benefits may reduce operating costs and/or environmental friendliness of a wastewater treatment system and operation.

In at least one embodiment, a method of treating wastewater may comprise introducing wastewater into a primary separator prior to biological treatment. As used herein, the term "primary separator" refers to a separator that mechanically or physically separates suspended solids from the wastewater. In certain embodiments, suspended solids are allowed to settle over a period of time using gravity. In some embodiments, a large amount, for example, about 60% of total suspended solids (TSS) may be removed using gravity separation. A primary separator may be one component in a primary treatment process. The primary treatment process may be a physical settling or retention process, where organics may be removed from the wastewater through flotation or sedimentation. Non-limiting examples of clarifiers or components thereof that can be utilized in one or more configurations of the present treatment systems include, but are not limited to the ENVIREX® FLOC-CLARIFIER system, the SPIRA-CONE™ upflow sludge blanket clarifier, RIM-FLO® circular clarifier, and the TRANS-FLO® clarifier, from Siemens Water Technologies Corp.

In certain embodiments, the primary separator may use magnetic particles to separate the suspended solids from the wastewater. For example, magnetic separation techniques may be used such as those described in U.S. Pat. No. 7,695,623, which is incorporated herein by reference in its entirety.

In certain embodiments, the method may further comprise separating a first carbon source comprising non-solubilized suspended carbon from the wastewater in the primary separator to form an effluent. As used herein, the term "carbon source" refers to a source of carbon that is suitable as an energy source for heterotrophic microorganisms. A non-limiting example of a carbon source comprising non-solubilized suspended carbon includes sludge produced in a wastewater treatment system, for example, primary sludge. Other examples of carbon sources include activated sludge, and one or more chemicals including methanol, ethanol, and acetic acid. In certain embodiments, the carbon source may comprise solubilized or hydrolyzed carbon, as explained below.

In at least one embodiment, a carbon source for use in an anoxic vessel or reactor may comprise activated sludge. As used herein, the terms "activated sludge," "secondary sludge," and "aerobically treated sludge" refer to sludge produced from a biological treatment unit. Activated sludge may comprise a living "culture" of organisms that help remove contaminants from wastewater. Activated sludge is produced in the biological treatment step, where different types of bacteria and microorganisms interact with each other and require oxygen to live. The resulting sludge from this process may comprise living and dead biomass, as well as organic and mineral components. The chemical formula for one form of a carbon source associated with activated sludge or biomass is $C_5H_7O_2N$. In certain embodiments, the carbon source may comprise chemicals, including methanol, ethanol, and acetic acid. In addition, other sources of carbon may include sugar and molasses. The carbon source may comprise one or more sources of solubilized carbon.

One or more of the embodiments disclosed herein may comprise one or more biological treatment units. As used herein, the term "biological treatment unit" refers to a reactor where a biological treatment process takes place. In certain embodiments, the biological treatment unit is at least one biological reactor selected from the group consisting of an anaerobic reactor, an anoxic reactor, and an aerobic reactor.

In certain embodiments, effluent from the primary separator may be introduced to an aerated anoxic biological treatment unit. As used herein, the terms "aerated anoxic biological treatment unit," "aerated anoxic reactor," and "anoxic reactor" refer to a biological reactor where a constant oxygen deficit condition is maintained and the overall oxygen delivery is less than the overall oxygen demand. The water or sludge in the anoxic reactor may be aerated and mixed for a period of time using diffusers or aerators. In certain aspects, the anoxic reactor functions as a denitrification reactor, where nitrate-nitrogen present in the influent is converted to elemental nitrogen. While oxygen may be present in a form that is combined with nitrogen, there may be no significant amount of dissolved oxygen present in the anoxic reactor. In certain aspects, optimal denitrification may require that the overall oxygen delivery not only be less than the demand, but must also be less than the demand minus the oxygen recovered through denitrification. The environmental conditions in the anoxic reactor may maintain dissolved oxygen (D.O.) concentrations at less than about 0.5 mg/l. The effluent or wastewater being treated may be held within the anoxic reactor for a designated period of time. The anoxic reactor may serve to denitrify, or reduce the nitrate and nitrite levels of the wastewater. This may be accomplished because the microorganisms are continuing to seek oxygen and the lack of oxygen in a dissolved form forces them to reduce the nitrate and nitrite compounds to nitrogen gas. This leaves nitrogen in a stable gaseous form ($N_2$) and consequently permits it to escape the liquid surface.

In one or more embodiments, a quantity of a carbon source may be introduced into the aerated anoxic biological treatment unit. The source of carbon may be added in any manner. For example, the carbon may be metered directly into a process stream or treatment unit within the treatment system. In at least one embodiment, at least a portion of non-solubilized carbon may be solubilized in the aerated anoxic biological treatment unit. In certain aspects, solubilizing may include aerating the reactor contents using diffusers or aerators for a period of time until at least a portion of the carbon is soluble.

In certain embodiments, the quantity of the carbon source introduced into the aerated anoxic biological treatment unit may include from about 0% to about 80% of a total quantity of primary sludge removed from the primary separator. In other embodiments, the quantity may range from about 15% to about 75% of the primary sludge removed from the primary separator. The quantity may depend on one or more process parameters. For example, the quantity may depend on the quality of the wastewater introduced to the primary separator and the amount of soluble BOD in the anoxic reactor. In various embodiments, wastewater with more suspended BOD will have a greater reduction in the reactor and may require more carbon to be added. In certain embodiments the reactor or system conditions may comprise a higher concentration of soluble BOD and will therefore require smaller quantities of carbon to be added.

In one or more embodiments, one or more process parameters in the aerated biological treatment unit may be measured to obtain a value. The process parameter may be any parameter that correlates with the functionality of the reactor, such as flow rates, material properties, and treatment conditions. For example, the process parameter may be a BOD level, such as the concentration of soluble BOD, or the concentration of suspended BOD. In other examples, the process parameter may be a ratio of the BOD to the total Kjeldahl nitrogen (TKN) in one or more process streams. For example, the process parameter may be the ratio of BOD to TKN of the effluent from the primary separator. The process parameter may be measured by one or more sensors placed in the reactor or in a process stream that is in communication with a control system. Alternatively, the process parameter may be measured from a sample of material removed from the treatment system and analyzed in a separate location. The control system may be configured to compare the value of the one or more process parameters with a target value to obtain a result. The control system may respond to the result by controlling one or more elements of the treatment system. In certain instances, the control system may be configured to introduce or adjust a quantity of one or more carbon sources introduced into the aerated anoxic reactor responsive to the result. For example, if the concentration of soluble BOD level in the aerated anoxic reactor is too low, the control system may be configured to open a valve to a source of primary sludge and the primary sludge may be introduced into the aerated anoxic reactor.

In still further embodiments, the anoxically treated liquid from the aerated anoxic biological treatment unit may be introduced into an aerobic treatment unit. The term "aerobic" as used herein refers, in general, to the presence of oxygen at a level of, for example, about 2 mg/l or more. The aerobic treatment unit may be maintained under aerobic conditions to promote the growth and/or metabolic activity of aerobic bacteria. The aerobic bacteria may, for example, facilitate and/or enhance the efficiency of a nitrifying process. The aerobic bacteria may also, for example, facilitate and/or enhance the efficiency of a phosphorus uptake process in which soluble phosphorous is restored to the bacteria. In at least one embodiment, the anoxically treated liquid may be treated in the aerobic treatment unit to form an aerobically treated liquid. In some embodiments, conditions may be provided or maintained in the aerobic treatment unit so that at least a portion of the anoxically treated liquid is formed into aerobically treated liquid. In a further embodiment, an aerobically treated sludge may be separated from the aerobically treated liquid. In certain instances, a portion of the sludge may be introduced to the aerated anoxic biological treatment unit as a source of carbon. In yet a further embodiment, the aerobically treated liquid may be introduced into a secondary separator. In some cases, solids may be removed from the aerobically treated liquid in the secondary separator. A portion of the removed solids may be introduced into the aerated anoxic biological treatment unit.

In various embodiments, the wastewater treatment system may comprise an anaerobic treatment unit. The anaerobic treatment unit may be maintained under anaerobic conditions to promote the growth and/or metabolic activity of anaerobic bacteria. The term "anaerobic conditions," as used herein, refers to an absence of oxygen. For example, the environment in the anaerobic reactor may be maintained at a concentration of less than 0.2 mg/l of DO. The anaerobic bacteria may, for example, facilitate and/or enhance the efficiency of a phosphorous release process in which the bacteria may take up volatile fatty acids through a mechanism involving hydrolysis and release of phosphate.

According to one or more embodiments, the wastewater treatment system may comprise a membrane bioreactor system. The membrane bioreactor system may comprise one or more porous or semi-permeable membranes. The membranes may be positioned so as to be submerged during operation and may have any configuration suitable for a particular purpose, such as a sheet or hollow tube. The membrane may be formed of any material (natural or synthetic) suitable for a particular filtration process.

One or more membranes may be positioned in one or more membrane modules within the membrane bioreactor system. The membrane modules may have any shape and cross-sectional area suitable for use in a desired application, for example, square, rectangular, or cylindrical. Multiple membrane modules may be positioned adjacent to one another or at predetermined positions within the membrane bioreactor system. The membrane modules may be positioned at any angle, including vertical and horizontal, within the membrane bioreactor system.

In accordance with one or more embodiments, a wastewater treatment system may be provided. The wastewater treatment system may comprise a primary separator. The primary separator may be provided and characterized as previously discussed and may be in fluid communication with a source of wastewater. The primary separator may comprise one or more outlets. For example, the primary separator may comprise a first outlet and a second outlet. The primary separator may be configured to output a first source of carbon comprising non-solubilized suspended carbon from a first outlet and to output an effluent from a second outlet. In certain embodiments, the first source of carbon may comprise primary sludge.

In a further embodiment, the wastewater treatment system comprises a biological treatment unit. The biological treatment unit may be provided and characterized as previously discussed. In certain embodiments, the biological treatment unit may include one or more inlets. For example, the biological treatment unit may include a first inlet and a second inlet. The first inlet may be in fluid communication with the first outlet of the primary separator. The second inlet may be in fluid communication with the second outlet of the primary separator. In one or more embodiments, the biological treatment unit may be an aerated anoxic treatment unit.

According to one or more embodiments, the wastewater treatment system may further comprise a control system. The control system may strategically manage the concentration of oxygen in various process streams within the system to facilitate pollutant removal. Oxygen may be present in various forms within the different elements of the system. For example, process streams within the system may contain dissolved oxygen and/or oxygenated species, such as, but not limited to, nitrates and nitrites, any of which may either originate in the wastewater or be produced by treatment processes occurring with one or more elements of the treatment system, such as an aerated anoxic treatment unit. Without being bound by any particular theory, the presence of oxygen may promote certain biological processes, such as aerobic biological processes, while inhibiting others such as anaerobic biological processes. More specifically, oxygen may interfere with portions of metabolic schemes involved in the biological removal of nitrogen. Oxygen may also interfere with a release of phosphorous, which may in turn limit the uptake of phosphorous. Thus, delivering process streams with a high concentration of oxygen to one or more elements of the treatment system, such as treatment units where oxygen may promote biological activity, and reducing the concentration of oxygen in process streams delivered to treatment units where oxygen may interfere with biological processes, may be beneficial. Strategic management of the concentration of oxygen in streams within the wastewater treatment system may allow reduced equipment size, faster reaction rates, and overall improved biological removal of pollutants.

The control system may comprise one or more sensors. Non-limiting examples of sensors suitable for use in the methods and systems described herein may include DO galvanic probes, DO optical probes, oxidation-reduction potential (ORP) probes, or any sensor capable of detecting the concentration of oxygen present at any point within the treatment system, as well as or any other sensor that measures process conditions. The sensor may be positioned, for example, so as to determine the concentration of oxygen in a process stream entering the aerated anoxic treatment unit. In certain embodiments, the sensors may detect or measure a process parameter and report the value to the control system. The control system may be configured to compare the detected or measured value with a target value. Responsive to a result of the comparison, the control system may be configured to select a quantity of a first carbon source to be introduced into the biological treatment unit. The control system may control the quantity of the first carbon source introduced into the biological treatment unit by using one or more valves distributed throughout the treatment system.

In another embodiment, the wastewater treatment system further comprises a second or supplemental source of carbon comprising solubilized carbon. The second source of carbon may include at least one of methanol, ethanol, and acetic acid. The second source of carbon may be in fluid communication with the biological treatment unit.

In certain embodiments, the wastewater treatment system further comprises an aerobic treatment unit. The aerobic treatment unit may comprise one or more inlets. For example, the aerobic treatment unit may comprise an inlet in fluid communication with an outlet of the aerated anoxic treatment unit. In a further embodiment, a third inlet of the aerated anoxic treatment unit is in fluid communication with an outlet of the aerobic treatment unit.

In yet a further embodiment, the wastewater treatment system further comprises a secondary separator. The secondary separator may use any one of the separation techniques (gravity, magnetic media, etc.) as discussed above. The secondary separator may include one or more inlets and one or more outlets. In some embodiments, the inlet may be in fluid communication with an outlet of the aerobic treatment unit. In certain embodiments, the outlet may be configured to output activated sludge. In various embodiments, a third inlet of the aerated anoxic treatment unit may be in fluid communication with the outlet of the secondary separator.

In certain embodiments, the wastewater treatment system may further comprise a measurement system. The measurement system may be in communication with the control system. In some embodiments, the measurement system may function as one or more components of a control system. The measurement system may be in communication with one or more sensors in the treatment system, as previously discussed. In various embodiments, the measurement system may be configured to measure one or more process parameters. For example, the measurement system may be configured to measure a level of BOD in the biological treatment unit. The measurement system may also be configured to measure a ratio of BOD to TKN in the effluent from the primary separator.

In various embodiments, the wastewater treatment system may further comprise a device that treats incoming wastewater and/or primary sludge into a process stream that is able to be transported to one or more elements of the treatment system. For example, the wastewater or primary sludge may be pulverized to eliminate or reduce the size of large solids or other materials that may clog one or more filters, conduits, or distribution systems. The resulting process stream may be easier to transport or introduce into one or more elements of the treatment system. For example, primary sludge may be treated to produce a liquid stream that is capable of flowing through a conduit or is otherwise capable of being readily introduced into one or more biological treatment units.

In accordance with one or more embodiments, a method of modifying a water treatment system including a primary separator and an aerated anoxic treatment unit positioned downstream of the primary separator is provided. The method may comprise providing for introduction of a first carbon source comprising primary sludge from the primary separator into the aerated anoxic treatment unit. The method may further include providing for a control system to select a non-zero quantity of the first carbon source and a quantity of a second carbon source including at least one of methanol, ethanol, and acetic acid to be introduced into the aerated anoxic treatment unit. As used herein, the term "quantity" includes zero. For example, in certain embodiments, there may be no introduction of a second source of carbon into an aerated anoxic treatment unit. The non-zero quantity of the first carbon source and the quantity of the second carbon source introduced into the aerated anoxic treatment unit may be selected responsive to a result of a comparison between a value of a process parameter of the water treatment system and a target value for the process parameter. For example, the process parameter correspond to a BOD level in the aerated anoxic treatment unit. In certain embodiments, the concentration of nitrate in anoxically treated liquid exiting the aerated anoxic treatment unit may be reduced by about 50%.

FIG. 1 illustrates a wastewater treatment system 10 in accordance with one or more embodiments of the present invention. The wastewater treatment system includes a source of wastewater 110 fluidly connected through conduit or distribution system 101 to a first treatment apparatus 120. The first treatment apparatus may include a primary clarifier. The primary clarifier may produce a first effluent and a primary sludge. The first effluent may be directed through a conduit or distribution system 102 to a second treatment apparatus 130. The primary sludge from the primary clarifier may be directed through a conduit or distribution system 103 to a point of use 104, where the primary sludge may undergo further processing.

A portion of the primary sludge may be directed through a conduit or distribution system 105 to second treatment apparatus 130. Second treatment apparatus 130 may be an aerated anoxic treatment unit. The second treatment apparatus may perform bacterial denitrification and reduction of BOD levels to produce a second effluent in the form of an anoxically treated liquid. The second effluent may be directed through a conduit or distribution system 106 to a third treatment apparatus 140.

The third treatment apparatus 140 may aerobically treat the second effluent to produce a third effluent. Third treatment apparatus 140 may be an aerobic treatment unit. Third treatment apparatus 140 may produce an aerobically treated sludge. The third effluent may be directed through a conduit or distribution system 108 to a fourth treatment apparatus 150. Fourth treatment apparatus 150 may be a secondary separator. In addition to, or in the alternative to being introduced to the fourth treatment apparatus 150, the third effluent may be directed through a conduit or distribution system 109 to a point of use, where the third effluent or may undergo further processing. A first portion of the aerobically treated sludge from third treatment apparatus 140 may be directed through a conduit or distribution system 107 to the second treatment apparatus 130. A second portion of the aerobically treated sludge may be directed through a conduit or distribution system 114 to a point of use 115, where the aerobically treated sludge may undergo further treatment or disposal.

The fourth treatment apparatus 150 may remove solids from the third effluent to produce a fourth effluent. A portion of the removed solids may be directed through a conduit or distribution system 111 to second treatment apparatus 130. In addition, or in the alternative to being introduced to second treatment apparatus 130, the removed solids may be directed through a conduit or distribution system 112 to a point of use, where the removed solids may undergo further processing. The fourth effluent may be directed through a conduit or distribution system 113 to a point of use, where the fourth effluent may undergo further processing or be disposed.

EXAMPLE

A biological nutrient removal system (Orbal™ from Siemens Water Treatment Corp.) including a primary clarifier, an aerated anoxic reactor positioned downstream of the primary clarifier, and an aerobic reactor positioned downstream of the aerated anoxic reactor, were operated for approximately 48 days without primary sludge introduction to the aerated anoxic reactor. The average effluent $NO_3$—N concentration in the effluent was approximately 5-6 mg/l.

Figure 2:
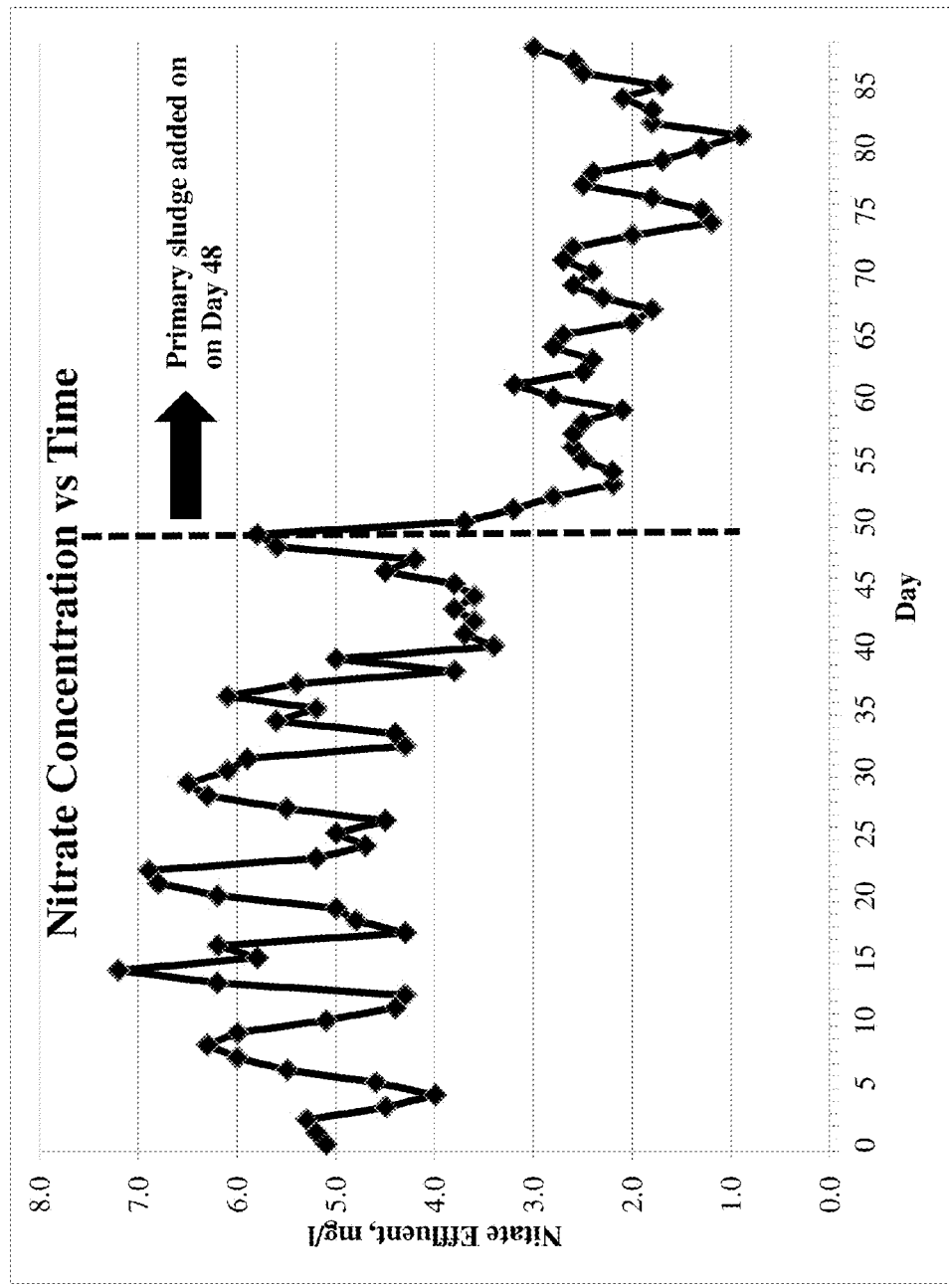
FIG. 2 is a graph of nitrate reduction over time for treatment systems pertinent to one or more aspects of the invention.

The system was modified so that primary sludge from the primary clarifier was added to the aerated anoxic reactor on day 48 of the experiment. Approximately 20% to 50% of the primary sludge removed from the primary clarifier was introduced into the aerated anoxic reactor. The $NO_3$—N concentration over the entire testing period is shown in FIG. 2. The results indicate that the $NO_3$—N concentration was reduced to approximately 2 mg/l as a result of adding the primary sludge to the aerated anoxic reactor.

This result shows the effectiveness of adding primary sludge as a carbon source to an aerated anoxic biological nutrient removal system. The concentration of nitrate was reduced by about 50%.

This invention is not limited to the type of biological nutrient removal system. Any process and/or system that requires the addition of a supplemental source of carbon to promote the growth of denitrifiers can benefit from using primary sludge as the carbon source.

The methods and systems described herein are not limited in their application to the details of construction and the arrangement of components set forth in the previous description or illustrations in the figures. The methods and systems described herein are capable of other embodiments and of being practiced or of being carried out in various ways. Also, the phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, as well as alternate embodiments consisting of the items listed thereafter exclusively.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a water treatment system. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature, system, or method described herein. In addition, any combination of two or more such features, systems, or methods, if such features, systems or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some cases, the systems may involve connecting or configuring an existing facility to comprise a treatment system or components of a treatment system, for example, using the methods and systems comprising primary sludge as disclosed herein. Accordingly, the foregoing description and figures are by way of example only. Further, the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A method of treating wastewater, the method comprising:
   introducing wastewater into a primary separator;
   separating a first carbon source comprising non-solubilized suspended carbon from the wastewater in the primary separator to form an effluent;
   removing the first carbon source from the primary separator;
   introducing the effluent into an aerated anoxic treatment unit;
   measuring a value of a process parameter in the aerated anoxic treatment unit;
   comparing the value of the process parameter to a target value to obtain a result;
   introducing a quantity of the first carbon source into the aerated anoxic treatment unit directly from the primary separator, the quantity introduced responsive to the result;
   solubilizing at least a portion of the non-solubilized suspended carbon in the first carbon source in the aerated anoxic treatment unit; and
   providing conditions for the effluent to be treated in the aerated anoxic treatment unit to form an anoxically treated liquid.

2. The method of claim 1, wherein the first carbon source comprises primary sludge.

3. The method of claims 1, wherein the quantity of the first carbon source introduced into the aerated anoxic treatment unit ranges from about 15% to about 75% of a total quantity of the first carbon source removed from the primary separator.

4. The method of claim 1, further comprising introducing a second carbon source including one of methanol, ethanol, and acetic acid into the aerated anoxic treatment unit, the quantity of the second carbon source introduced into the aerated anoxic treatment unit responsive to the result.

5. The method of claim 1, wherein measuring the value of the process parameter comprises measuring a level of biological oxygen demand in the aerated anoxic treatment unit.

6. The method of claim 5, further comprising:
   determining a ratio of biological oxygen demand to total Kjeldahl nitrogen in the effluent; and
   adjusting the quantity the first carbon source introduced into the aerated anoxic treatment unit based on the ratio.

7. The method of claim 1, further comprising:
   introducing the anoxically treated liquid into an aerobic treatment unit; and
   providing conditions for the anoxically treated liquid to be treated in the aerobic treatment unit to form an aerobically treated liquid.

8. The method of claim 7, further comprising:
   separating an aerobically treated sludge from the aerobically treated liquid; and
   introducing a portion of the aerobically treated sludge into the aerated anoxic treatment unit.

9. The method of claim 7, further comprising:
   removing solids from the aerobically treated liquid in a secondary separator; and
   introducing the removed solids into the aerated anoxic treatment unit.

10. A wastewater treatment system comprising:
    a primary separator in fluid communication with a source of wastewater, the primary separator configured to output a first carbon source comprising non-solubilized suspended carbon from a first outlet and to output an effluent from a second outlet;

a biological treatment unit including a first inlet in fluid communication with the first outlet of the primary separator and a second inlet in fluid communication with the second outlet of the primary separator; and a control system configured to select a quantity of the first carbon source to be introduced into the biological treatment unit responsive to a result of a comparison between a value of a process parameter of the wastewater treatment system and a target value for the process parameter.

11. The system of claim 10, wherein the biological treatment unit is an aerated anoxic treatment unit.

12. The system of claim 11, further comprising a second carbon source comprising solubilized carbon in fluid communication with the aerated anoxic treatment unit.

13. The system of claim 12, wherein the second carbon source includes at least one of methanol, ethanol, and acetic acid.

14. The system of claim 11, further comprising an aerobic treatment unit having an inlet in fluid communication with an outlet of the aerated anoxic treatment unit.

15. The system of claim 14, wherein a third inlet of the aerated anoxic treatment unit is in fluid communication with an outlet of the aerobic treatment unit.

16. The system of claim 14, further comprising a secondary separator having an inlet in fluid communication with an outlet of the aerobic treatment unit and an outlet configured to output activated sludge.

17. The system of claim 16, wherein a third inlet of the aerated anoxic treatment unit is in fluid communication with the outlet of the secondary separator.

18. The system of claim 10, further comprising a measurement system configured to measure at least one of a level of biological oxygen demand in the biological treatment unit and a ratio of biological oxygen demand to total Kjeldahl nitrogen in the effluent.

19. A method of modifying a water treatment system including a primary separator and an aerated anoxic treatment unit positioned downstream of the primary separator, the method comprising:

providing for introduction of a first carbon source comprising primary sludge from the primary separator into the aerated anoxic treatment unit; and providing for a control system to select a non-zero quantity of the first carbon source and a quantity of a second carbon source including at least one of methanol, ethanol, and acetic acid to be introduced into the aerated anoxic treatment unit responsive to a result of a comparison between a value of a process parameter of the water treatment system and a target value for the process parameter.

20. The method of claim 19, wherein the method includes reducing a concentration of nitrate in anoxically treated liquid exiting the aerated anoxic treatment unit by about 50%.

* * * * *